United States Patent [19]
Colyer

[11] Patent Number: 5,492,454
[45] Date of Patent: Feb. 20, 1996

[54] TRANSPORTER DEVICE FOR JET SKIS

[76] Inventor: Wendell L. Colyer, 129 Hickory La., Oliver Springs, Tenn. 37840

[21] Appl. No.: 368,970

[22] Filed: Jan. 5, 1995

[51] Int. Cl.⁶ .................................................. B60P 9/00
[52] U.S. Cl. ........................... 414/462; 280/495; 224/495
[58] Field of Search .................................. 414/462, 539, 414/540, 467; 280/456.1, 460.1, 495; 224/42.43, 42.45 R, 42.07, 489, 495, 502, 533

[56] References Cited

U.S. PATENT DOCUMENTS

| | | | |
|---|---|---|---|
| 3,591,029 | 7/1971 | Coffey | 414/462 |
| 3,720,333 | 3/1973 | Vaughn | 414/462 |
| 4,268,212 | 5/1981 | Weary | 414/539 |
| 4,989,765 | 2/1991 | Huebner | 224/42.07 |
| 5,005,846 | 4/1991 | Taylor | 280/30 |

FOREIGN PATENT DOCUMENTS 0883398  6/1953  Germany ........................ 280/456.1

*Primary Examiner*—Michael S. Huppert
*Assistant Examiner*—Douglas A. Hess

[57] ABSTRACT

A transporter device for jet skis comprised of a first support attachable the rear of a vehicle. A second support attachable to the vehicle. A transverse support is coupled at intermediate points to the rearward ends of the primary supports. A quick disconnect couples the first main support with the cross support. A swivel joint couples the rearward end of the second main support with the cross support. The cross-support is formed with a small channel member coupled to the second primary support and a large channel member receiving the small channel member at an intermediate extent and coupled to the first primary support. A quick disconnect pin couples the two channel members of the cross support to effect its shortening and lengthening. A pair of cradle members are secured to the large channel member for receiving thereon a jet ski with a forward upwardly extending support secured to the smaller channel member with a wench for supporting the forward end of a jet ski whereby a jet ski may be transported.

4 Claims, 5 Drawing Sheets

FIG. 1
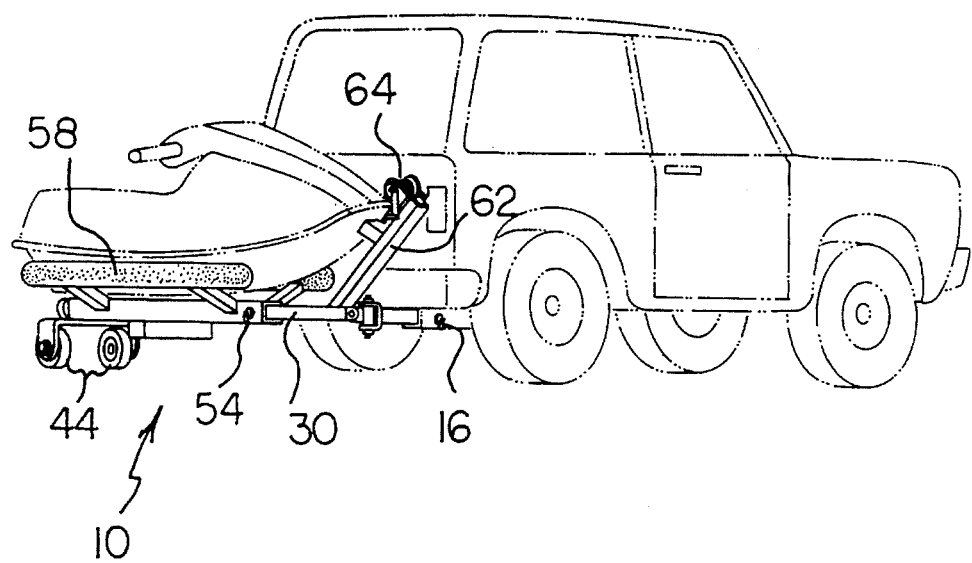
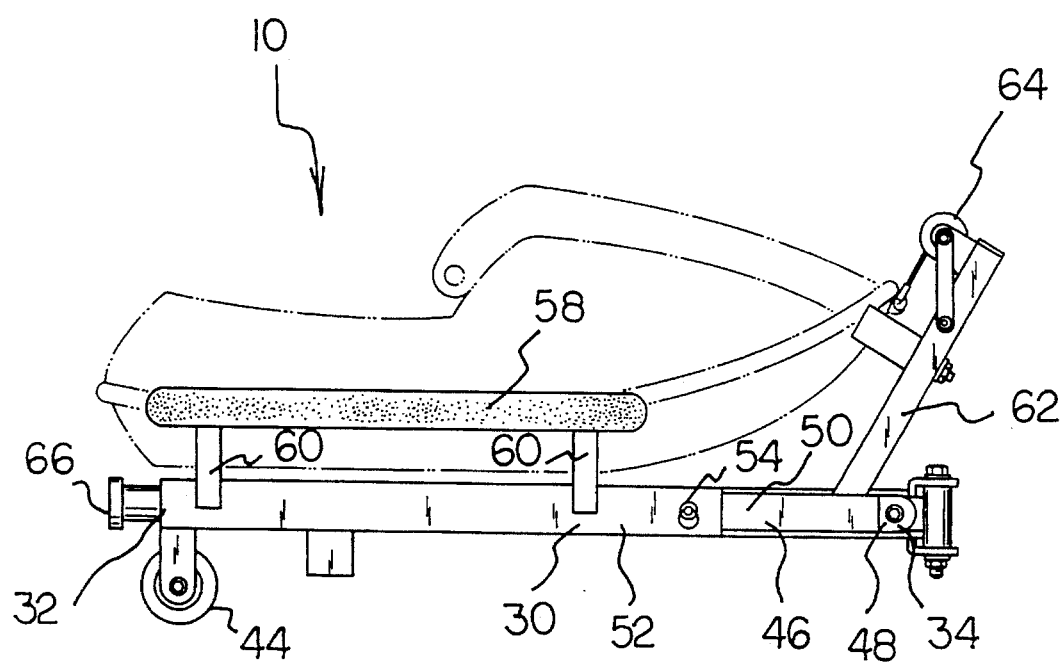
FIG. 2

TRANSPORTER DEVICE FOR JET SKIS

BACKGROUND OF THE INVENTION

1. Field of the Invention

The present invention relates to a transporter device for jet skis and more particularly pertains to transporting jet skis and like devices on the rear of a vehicle.

2. Description of the Prior Art

The use of trailers for supporting a wide variety of objects behind a truck or car is known in the prior art. More specifically, trailers for supporting a wide variety of objects behind a truck or car heretofore devised and utilized for the purpose of transporting devices such as jet skis behind a truck, van or the like through trailers of wide varieties of design and configurations are known to consist basically of familiar, expected and obvious structural configurations, notwithstanding the myriad of designs encompassed by the crowded prior art which have been developed for the fulfillment of countless objectives and requirements.

By way of example, the prior art in U.S. Pat. No. 3,503,620 to Koskovich discloses a multiple purpose trailer conveyance.

U.S. Pat. No. 4,603,872 to White discloses a jet-ski dolly.

U.S. Pat. No. 5,005,846 to Taylor discloses a jet ski transporter carriage and related methods.

U.S. Pat. No. 5,016,893 to Hart discloses a collapsible support and transport stand for personal watercraft.

U.S. Pat. No. 5,082,307 to Hollingworth discloses a mini boat/camping trailer.

In this respect, the transporter device for jet skis according to the present invention substantially departs from the conventional concepts and designs of the prior art, and in so doing provides an apparatus primarily developed for the purpose of transporting jet skis and like devices on the rear of a vehicle.

Therefore, it can be appreciated that there exists a continuing need for a new and improved transporter device for jet skis which can be used for transporting jet skis and like devices on the rear of a vehicle. In this regard, the present invention substantially fulfills this need.

SUMMARY OF THE INVENTION

In view of the foregoing disadvantages inherent in the known types of trailers for supporting a wide variety of objects behind a truck or car now present in the prior art, the present invention provides an improved transporter device for jet skis. As such, the general purpose of the present invention, which will be described subsequently in greater detail, is to provide a new and improved transporter device for jet skis apparatus and method which has all the advantages of the prior art and none of the disadvantages.

To attain this, the present invention essentially comprises a new and improved transporter device for jet skis comprising, in combination, a first support having an interior end attachable to the rear of a vehicle, the first support having an exterior end; a second support having an interior end attachable to the rear of a vehicle, the second support having an exterior end with a bend in an intermediate location thereof; a transverse support having a free end and a pilot end coupled to the exterior end of the secondary support; a first quick disconnect pin coupling the first support with the transverse support; a swivel joint coupling the exterior end of the second support with the transverse support, the swivel joint adapted for rotation about both a vertical axis and in a horizontal axis; coupling components intermediate the transverse support, the transverse support being formed with a small interior member coupled at one end to the swivel joint and a second end, the transverse support also including a large exterior channel member receiving the small interior member for telescopically varying the length of the transverse support, the exterior channel member being coupled to the first support with a first quick disconnect pin and with a second quick disconnecting pin coupling the interior and exterior members of the transverse support to effect its shortening and lengthening; two cradle members secured to the large channel member for receiving thereon a jet ski, the interior member having a forward upwardly extending support with a wench for supporting the forward end of a jet ski, whereby a jet ski may be transported when the interior member is received within the channel member and the transverse channel member is perpendicular to the first support and wherein the jet ski may be positioned on the cradle or removed therefrom when the first quick disconnect pin is removed and the transverse member is moved parallel with the first support; and a jack positionable within the channel member at its free remote from an interior member for raising and lowering the free end of the transverse member for leveling purposes.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved transporter device for jet skis which has all the advantages of the prior art trailers for supporting a wide variety of objects behind a truck or cars and none of the disadvantages.

It is another object of the present invention to provide a new and improved transporter device for jet skis which may be easily and efficiently manufactured and marketed.

It is a further object of the present invention to provide a new and improved transporter device for jet skis which is of a durable and reliable construction.

An even further object of the present invention is to provide a new and improved transporter device for jet skis which is susceptible of a low cost of manufacture with regard to both materials and labor, and which accordingly is then susceptible of low prices of sale to the consuming public, thereby making such trailers for supporting a wide variety of objects behind a truck or cars economically available to the buying public.

Still yet another object of the present invention is to provide a new and improved transporter device for jet skis which provides in the apparatuses and methods of the prior art some of the advantages thereof, while simultaneously overcoming some of the disadvantages normally associated therewith.

Still another object of the present invention is to transport jet skis and like devices on the rear of a vehicle.

Lastly, it is an object of the present invention to provide a new and improved transporter device for jet skis comprising a first support attachable at its interior end to the rear of a vehicle and having a second end; a second support having an interior end attachable to the vehicle and a second rearward end with a bend in an intermediate location thereof; a transverse support coupled at intermediate points to the rearward ends of the primary supports; a quick disconnect coupling the first main support with the cross support; a swivel joint coupling the rearward end of the second main support with the cross support, the swivel joint adapted for rotation in a vertical plane and in a horizontal plane; coupling components intermediate the cross-support, the cross-support being formed with a small channel member coupled to the second primary support and a large channel member receiving the small channel member at an intermediate extent and coupled to the first primary support, a quick disconnect pin coupling the two channel members of the cross support to effect its shortening and lengthening; a pair of cradle members secured to the large channel member for receiving thereon a jet ski with a forward upwardly extending support secured to the smaller channel member with a wench for supporting the forward end of a jet ski whereby a jet ski may be transported when the small channel member is fully received within the large channel member and the cross channel member is perpendicular to the first main support and wherein the jet ski may be positioned on the cradle or removed therefrom when the first quick disconnect is removed and the cross number is moved parallel with the first main support.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the new and improved transporter device for jet skis comprising in accordance with the principles of the present invention.

FIG. 2 is a front elevational view of the device shown in FIG. 1.

The same reference numeral refers to the same part throughout the various figures.

DESCRIPTION OF THE PREFERRED EMBODIMENT

Figure 3:
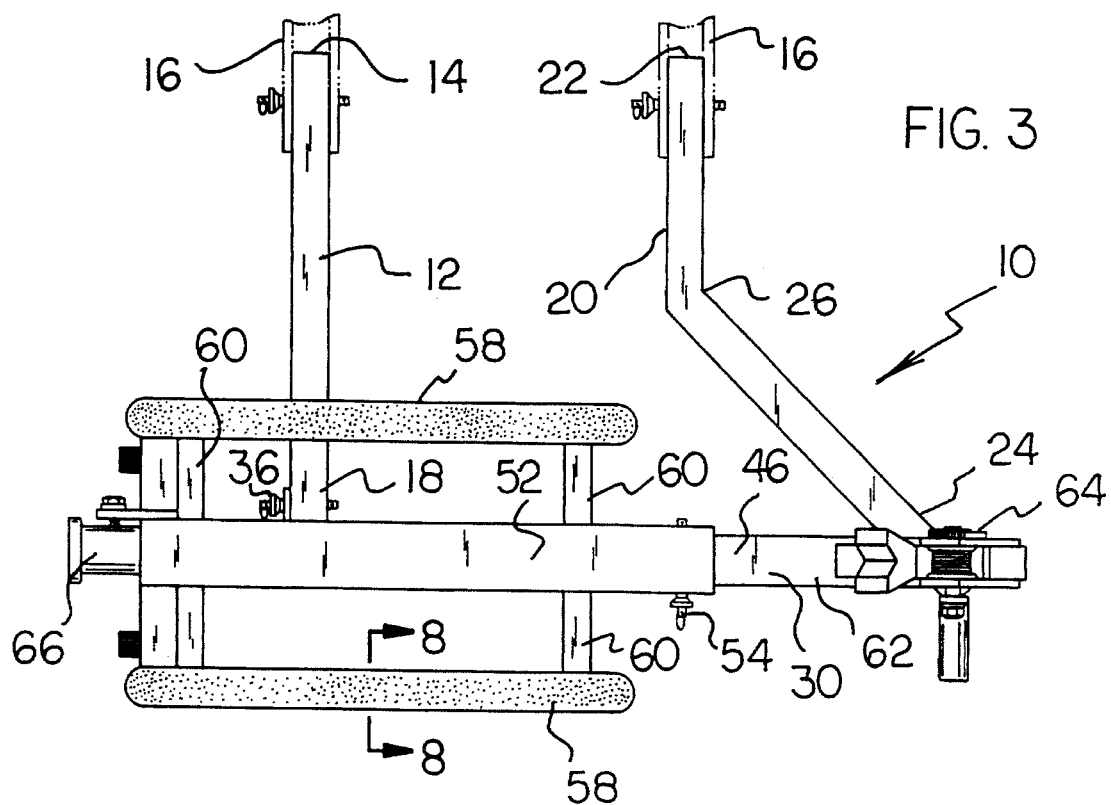
FIG. 3 is top elevational view of the device shown in FIGS. 1 and 2.
Figure 4:
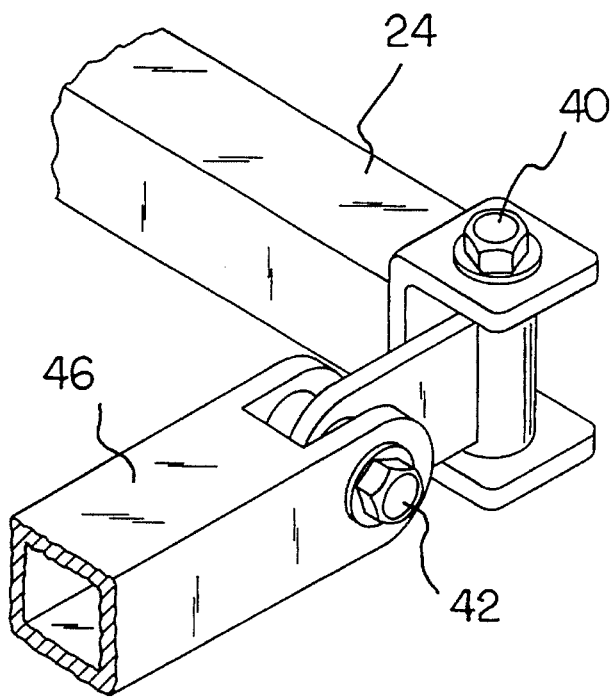
FIG. 4 is an enlarged perspective view of the joint holder shown in the prior Figure.
Figure 5:
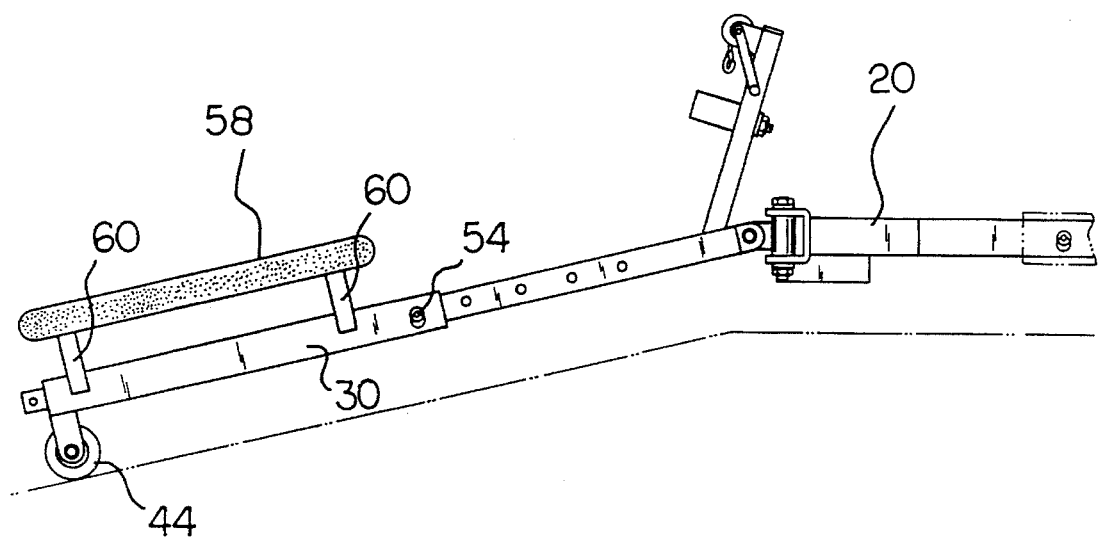
FIG. 5 is a side elevational view of the device of the FIGS. 1, 2 and 3 but illustrated in a position for loading and unloading the jet ski therefrom.
Figure 6:
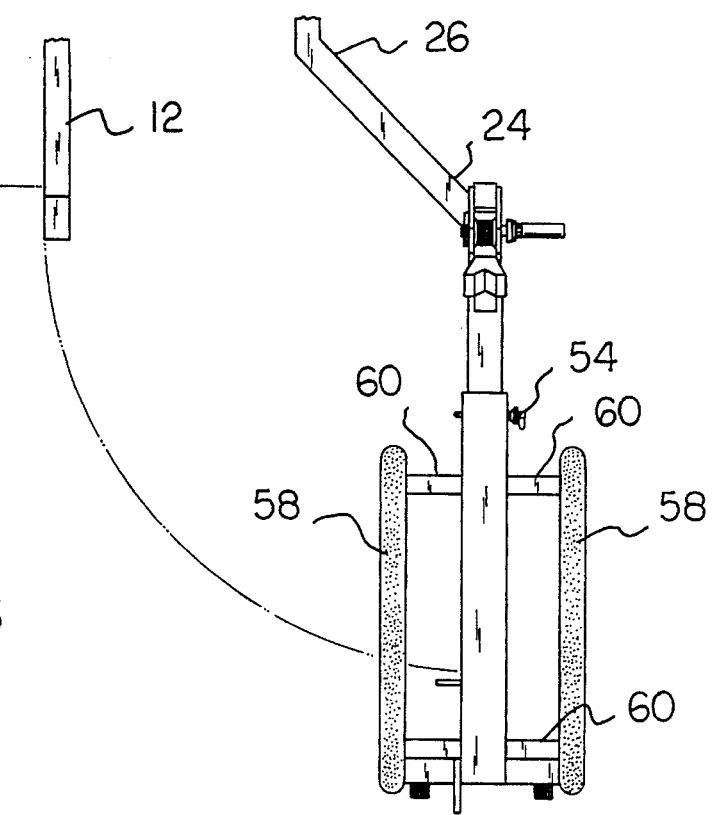
FIG. 6 is a top elevational view of the device as shown in FIG. 5.

With reference now to the drawings, and in particular to FIG. 1 thereof, a new and improved transporter device for jet skis embodying the principles and concepts of the present invention and generally designated by the reference numeral 10 will be described.

The present invention, the new transporter device for jet skis is a system 10 comprised of a plurality of components. Such components include, in their simplest terms, a first support, a second support, a first quick disconnect, a swivel joint, coupling components, two cradle members and a jack. Such components are individually configured and correlated with respect to each other so as to obtain the direct objective.

The first component of the system 10 is a first support 12. The first support has an interior end 14 attachable to the rear of a vehicle 16. The first support also has an exterior end 18. Extending parallel with the first support is a second support 20. The second support similarly has an interior end 22 attachable to the rear of a vehicle. The second support also has an exterior end 24. There is a bend 26 at an intermediate location along the length of the second support.

In association with the first and second supports is a transverse support 30. The transverse support has a free end 32 with wheels 44 beneath and a pivot end 34. The pivot end is coupled to the exterior end of the second support. A first quick disconnect 36 functions to couple the first main support with the transverse support during the transportation mode of the device. The quick disconnect pin is removed during the unloading and loading of a jet ski from the device.

A swivel joint is provided for coupling the exterior end of the second support with the pivot end of the transverse support. The swivel support is adapted for rotation about both a vertical axis through can 40 and a horizontal axis through can 42.

In association with the transverse support are coupling components intermediate the ends of the transverse support. The transverse support is formed of a small interior member 46. The interior member is coupled at one end 48 to the swivel joint. It also has a second end 50. The transverse support also includes a large exterior channel member 52 adapted to receive the small channel members. This allows for telescopically varying the length of the transverse support to meet a particular function and need. The exterior channel member is coupled to the first primary support with the first quick disconnect pin as discussed above. In addition, a second quick disconnect pin 54 extends through pre-selected apertures of the interior member and exterior channel member for varying the length thereof. Shortening and lengthening of the transverse support is thereby allowed but only when the first quick disconnect is removed and the transverse support extends rearwardly from the vehicle and the first and second supports.

Support of the jet ski is through two parallel cradle members 58. Such cradle members are secured to the large channel through vertical posts 60. The cradle members are for receiving thereon a jet ski. The interior member has a forward upwardly extending support 62. A winch 64 is provided at its upper end for supporting the forward end of the jet ski on the cradle members. In this manner a jet ski may be transported when the interior member is received within the channel member and the transverse number is perpendicular to the first support and second support. In addition, the jet ski may be positioned onto the cradle or removed therefrom when the first quick disconnect pin is removed and the transverse number is moved parallel with the first support.

Figure 7:
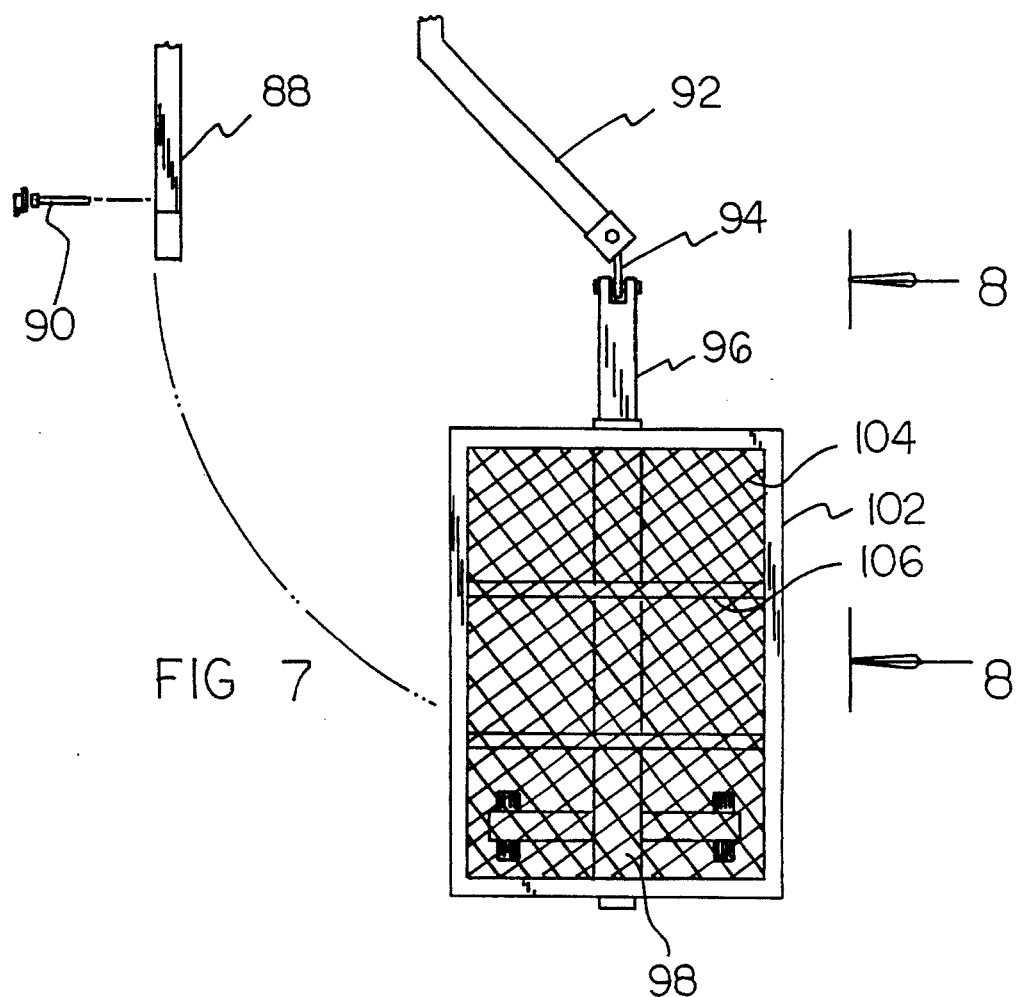
FIGS. 7 and 8 illustrate a further embodiment of the invention.
Figure 8:
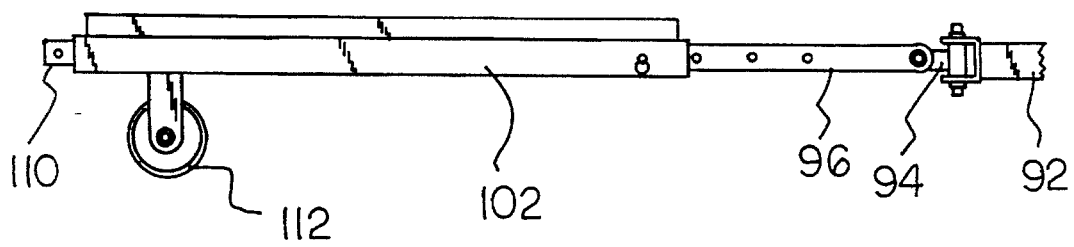

An additional embodiment is shown in FIGS. 7 and 8. In such embodiment, a rearwardly extending first support 88 and second support 92 are coupled to the rear of the vehicle as in the prior embodiments. A coupling assembly 94 couples the rearward end of the second support to the forward end of the transverse support. The transverse support includes a small interior channel member 96 and a large exterior channel member 98. The interior channel member 96 is adjustably received within the large exterior channel member 98 for varying the length of the support. A quick release pin secures the channel members in their intended position with respect to each other. Another quick release pin 90 couples the first support with respect to the transverse support during transportation as in the prior embodiment. A further similarity with the prior embodiment is the coupling assembly 96 which is pivotably coupled to the second support for rotation about a vertical axis during transportation and which is pivotably coupled to the small interior member for rotation about a horizontal axis during transportation.

Supported upon the large exterior channel member of the transverse support in this embodiment is a planar support formed of a rigid rectangular frame 102 fabricated of a metallic material with an interior plate 104. Such plate is also fabricated of a rigid material, preferably metal, such as an expanded metal forming diamond shaped apertures for reduced weight but with increased structural integrity. Cross braces 106 extend across the exterior channel member from edge to edge of the frame while supporting the plate. An extension 110 with a horizontal aperture allows for coupling addition components to the exterior channel member for transportation purposes. Lastly, wheels 112 on casters are coupled beneath the plate adjacent the rear end thereof as in the prior embodiment.

Figure 9:
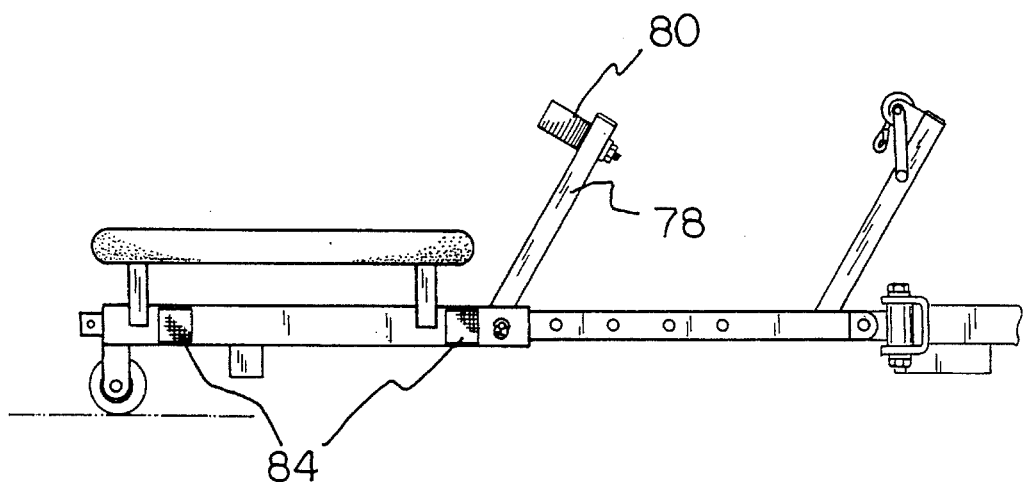
FIGS. 9 and 10 illustrate one final embodiment of the invention of the present application.
Figure 10:
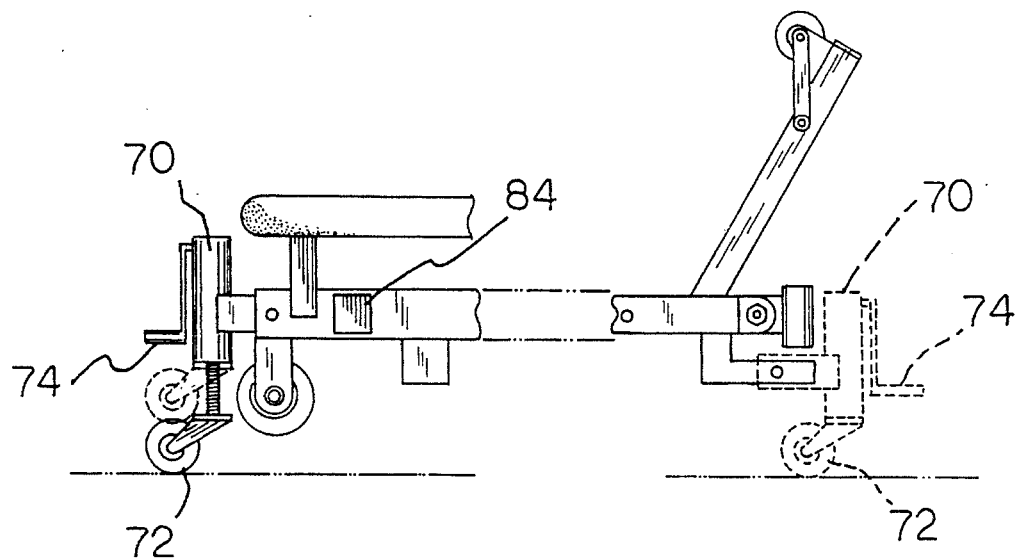

A yet further embodiment of the invention is shown in FIGS. 9 and 10. In such embodiment, an upstanding post 78 is provided. At its upper end is an arcuately shaped bow support 80 for receiving the forward end of a boat located on the cradle. This is for added stability of the system. It is located a fixed distance from the mechanisms which support the bow independent of the positioning of the bow support with respect to the vehicle to which the boat is coupled. In the FIG. 10 showing, an additional jack 70 is disclosed. Such jack is of the type having a reel 72 at its lower end and a hand crank 74 for raising and lowering the jack and supported object with respect to the ground upon which it is supported. In FIG. 10, the jack is shown in a position to support the rearward end of the cradle for movement as desired. Note is taken of the dotted line showing of the same jack but at the forward end of the cradle. In certain situations, two jacks might be utilized, one at each end of the cradle. The purpose of the jacks is for the convenient moving of the cradle from one position to another including those situations when the cradle is stored in a garage or basement.

One last feature is the use of reflectors 84 on the face of the cradle remote from the vehicle transporting the cradle and boat. In such position, the reflectors 84 will be seen by the driver of the car next following the cradle, boat and vehicle that is towing the cradle and boat.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved transporter device for jet skis comprising, in combination:

a first support having an interior end attachable to the rear of a vehicle, the first support having an exterior end;

a second support having an interior end attachable to the rear of a vehicle, the second support having an exterior end with a bend in an intermediate location thereof;

a transverse support having a free end and a pilot end coupled to the exterior end of the secondary support;

a first quick disconnect pin coupling the first support with the transverse support;

a swivel joint coupling the exterior end of the second support with the transverse support, the swivel joint adapted for rotation about both a vertical axis and in a horizontal axis;

coupling components intermediate the transverse support, the transverse support being formed with a small interior member coupled at one end to the swivel joint and a second end, the transverse support also including a large exterior channel member receiving the small interior member for telescopically varying the length of the transverse support, the exterior channel member being coupled to the first support with the first quick disconnect pin and with a second quick disconnecting pin coupling the interior and exterior members of the transverse support to effect its shortening and lengthening;

two cradle members secured to the large exterior channel member for receiving thereon a jet ski, the small interior member having a forward upwardly extending support with a winch for supporting the forward end of the jet ski, whereby the jet ski may be transported when the small interior member is received within the large exterior channel member and the transverse support is perpendicular to the first support and wherein the jet ski may be positioned on the cradle members or removed therefrom when the first quick disconnect pin is removed and the transverse member is moved parallel with the first support; and a jack positionable within the large exterior channel member at its free end remote from the small interior member for raising and lowering the free end of the transverse member for leveling purposes.

2. A transporter device for jet skis comprising:

a first support attachable at an interior end thereof to the rear of a vehicle and having a second end;

a second support having an interior end attachable to the vehicle and a second rearward end with a bend in an intermediate location thereof;

a transverse support coupled at intermediate points to the rearward ends of the first and second supports;

a quick disconnect pin coupling the first support with the transverse support;

a swivel joint coupling the rearward end of the second support with the transverse support, the swivel joint adapted for rotation in a vertical plane and in a horizontal plane;

coupling components intermediate the transverse support, the transverse support being formed with a small channel member coupled to the second support and a large channel member receiving the small channel member at an intermediate extent and coupled to the first support, a quick disconnect pin coupling the two channel members of the transverse support to effect its shortening and lengthening; and a support member secured to the large channel member for transporting objects.

3. The device as set forth in claim 2 wherein the transverse support includes:

a pair of cradle members secured to the large channel member for receiving thereon a jet ski with a forward upwardly extending support secured to the smaller channel member with a winch for supporting the forward end of a jet ski whereby a jet ski may be transported when the small channel member is fully received within the large channel member and the transverse support is perpendicular to the first main support and wherein the jet ski may be positioned on the cradle or removed therefrom when the first quick disconnect is removed and the transverse support is moved parallel with the first support.

4. The device as set forth in claim 2 and further including:

a jack positionable within the large channel member at an end remote from the small channel member for raising and lowering the adjacent end of the transverse support.

* * * * *